United States Patent
Trethewey

(10) Patent No.: US 7,321,925 B2
(45) Date of Patent: Jan. 22, 2008

(54) LOAD BALANCING AND FAULT TOLERANCE FOR SERVER-BASED SOFTWARE APPLICATIONS

(75) Inventor: James R. Trethewey, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1372 days.

(21) Appl. No.: 09/955,469

(22) Filed: Sep. 18, 2001

(65) Prior Publication Data

US 2003/0056002 A1   Mar. 20, 2003

(51) Int. Cl.
G06F 13/00   (2006.01)
G06F 17/30   (2006.01)

(52) U.S. Cl. .................. 709/219; 709/204; 709/227; 370/524; 707/102

(58) Field of Classification Search ................ 709/220, 709/224, 232, 226, 238, 227, 234, 228, 217, 709/203; 705/15; 370/60, 238, 229, 524; 707/102
See application file for complete search history.

(56) References Cited

U.S. PATENT DOCUMENTS 5,774,660 A * 6/1998 Brendel et al. ............. 709/201
6,041,355 A   3/2000 Toga
6,173,318 B1   1/2001 Jackson et al.
6,182,141 B1   1/2001 Blum et al.
6,289,382 B1 * 9/2001 Bowman-Amuah ......... 709/226
6,748,447 B1 * 6/2004 Basani et al. ............... 709/244
6,772,211 B2 * 8/2004 Lu et al. ..................... 709/226
6,779,039 B1 * 8/2004 Bommareddy et al. ..... 709/238
6,801,949 B1 * 10/2004 Bruck et al. ................ 709/232

OTHER PUBLICATIONS

Borella et al.. "RSIP: Address Sharing with End-to-End Security," Proceedings of the Special Workshop on Intelligence at the Network Edge, Mar. 20, 2000, San Francisco, CA, 9 pgs.

* cited by examiner

Primary Examiner—Khanh Dinh
(74) Attorney, Agent, or Firm—Fish & Richardson P.C.

(57) ABSTRACT

An application service provider provides to remote networked computers service sessions using one of a plurality of similarly functioning software applications residing on different servers with different unique network addresses. To request a service session, a remote computer transmits a "probe request" to a unique network address associated with the service provider. A load balancer then assigns one of the servers to provide the service. The service provider then sends back to the remote computer a "probe response" providing the unique network address of the assigned server. Thereafter, for packet-based messages sent by the remote computer that are part of the service session, the messages are addressed to the unique network address of the assigned server. "Probe request" and "probe response" messages may also be used during the course of a service session for fault tolerance.

40 Claims, 4 Drawing Sheets

LOAD BALANCING AND FAULT TOLERANCE FOR SERVER-BASED SOFTWARE APPLICATIONS

TECHNICAL FIELD

This invention relates to server-based software applications that involve latency-sensitive message traffic over a packet-switched network such as the Internet.

BACKGROUND

There are many server-based software applications that involve latency-sensitive message traffic over a packet-switched network such as the Internet. In many of these applications, the volume of message traffic is very high. Examples of these applications are Internet telephony, single- and multi-player gaming, music sharing, and other "peer-to-peer" type applications.

An application service provider may make the software application available to many remote users. To accommodate an increase in demand for this service, service providers sometimes add more servers with the same software application to the service provider's network of servers, or server farm. Typically, each of the parallel servers has a unique network address (e.g., Internet Protocol (IP) address). In some instances, service providers install a device known as a load balancer at the "front-end" of the server farm. The load balancer typically has a unique network address, which is known and used by all clients to access the provider's services. By accessing the load balancer, users need only know one network address, that of the load balancer, to gain access to the service.

The load balancer may distribute incoming traffic among the parallel servers evenly. The load balancer may also direct requests to a specific server if necessary. A load balancer has an upper bound to the amount of traffic it can handle. For example, a typical load balancer may saturate at a rate of 800 requests per second where the data packets are relatively small in size, i.e., light-weight packets. The number of requests that a load balancer can handle is drastically reduced as the size of the data packets increases, i.e., become heavier. Heavy packets may reduce the saturation level of a load balancer to 400 requests per second. For software applications where there is a high volume of traffic from users to the server, the load balancer may become a bottleneck for message traffic. This may lead to an increase in latency. Also, directing all messages through a load balancer in some cases results in an inefficient use of resources.

DESCRIPTION OF DRAWINGS

Like reference symbols in the various drawings indicate like elements.

DETAILED DESCRIPTION

The invention provides load balancing among similarly functioning software applications residing on parallel servers, while avoiding the problem of a load-balancing device becoming a bottleneck for message traffic from users to the servers. The invention also provides fault tolerance methods for these types of server-based software applications.

Figure 1:
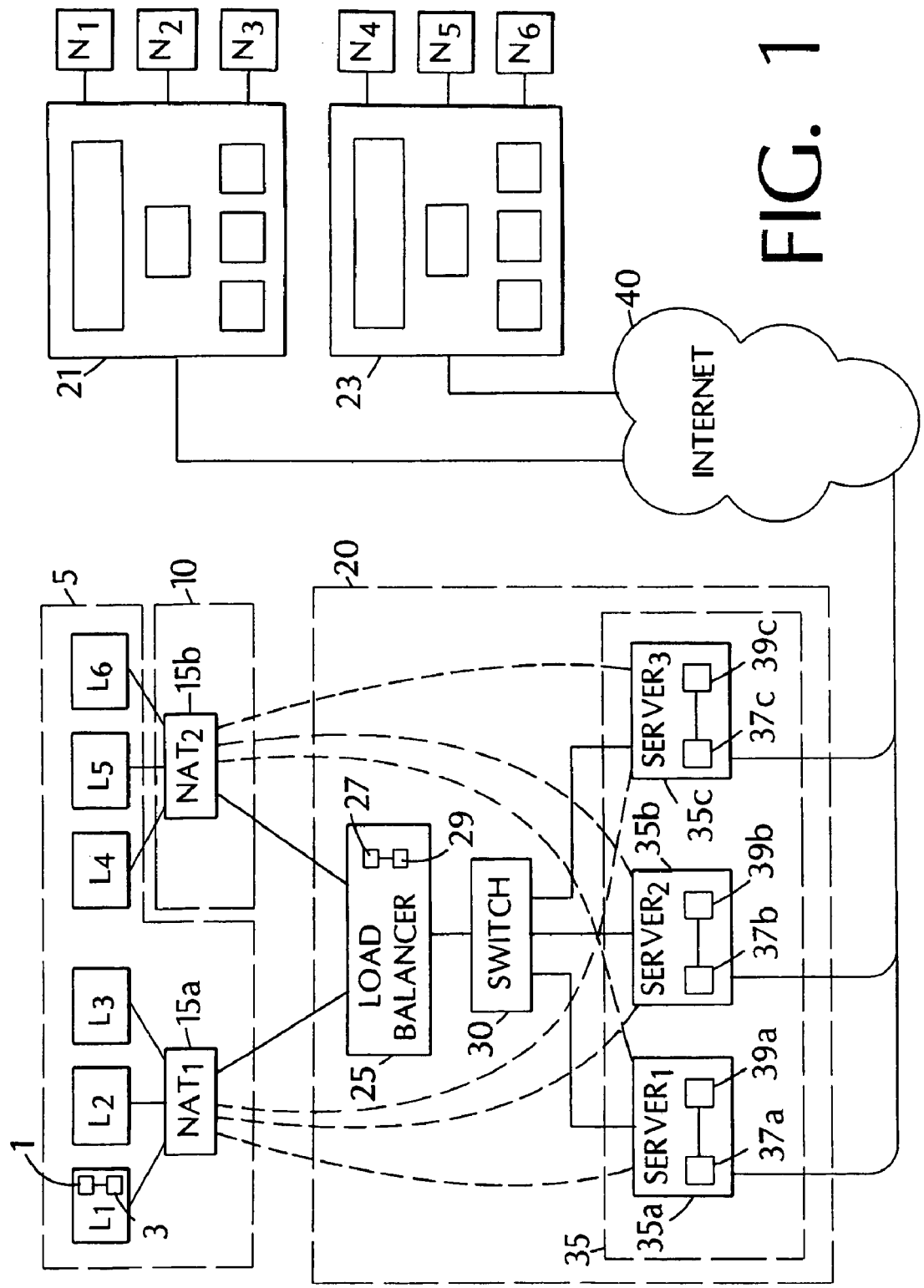
FIG. 1 is a block diagram of a network configuration that may incorporate aspects of the invention.

In FIG. 1, an Application Service Provider (ASP) 20 has multiple parallel servers 35a, 35b and 35c, each with a unique network address, for example, unique IP addresses in the case of the Internet. Each server 35a-c is capable of running, for remote users, a software application such as Internet telephony, single- and multi-player gaming, music sharing, and other "peer to peer" type applications. The ASP 20 also includes a load balancer 25, which too has a unique network address, and a switch 30. Together, the load balancer 25 and switch 30 balance the load among the servers 35a-c.

Various computers shown in FIG. 1, namely, computers $L_1$-$L_6$ and $N_1$-$N_6$, may have access to the application provided by the servers 35a-c. These computers are referred to generally as remote computers because they are remote from the servers 35a-35c. The remote computers have a processor 1 and memory 3. These remote computers have program instructions stored in memory 3 that, when executed by processor 1, transmit requests for a service session to ASP 20 to use a particular software application. In addition, some functions of the software application may be distributed and performed locally on the remote computers. Performing some functions of the software on the remote computers reduces the message traffic between the remote computer and a particular servers 35a-c.

There are two types of remote computers in the embodiment of FIG. 1, local client computers $L_1$-$L_6$ and non-local client computers $N_1$-$N_6$. Local client computers refer to client computers that access the group of servers 35 at local ASP 20. The non-local client computers refer to computers whose local access is to a different group of servers 35 at ASP 21 or ASP 23, or which although non-local computers $N_1$-$N_6$ may bypass servers 35 at their local ASP 21 or 23 and access servers 35 at ASP 20 via Internet 40. The non-local computers $N_1$-$N_6$ and ASP 21 or ASP 23 are referred to as non-local networks. The non-local computers and ASPs 21 and 23 may or may not be in the same local area as local computers and ASP 20. For example, ASP 20 could be located in California, ASP 21 in Minnesota, and ASP 23 in New York. Clients of the respective ASPs may establish communications with the ASP in their own local area. To communicate with clients in other local areas, the local ASP may establish communications with a non-local ASP over a packet-switched network such as the Internet 40.

As is conventional, the remote computers may be configured behind a gateway. FIG. 1 shows remote computers $L_1$-$L_6$ configured behind gateway network address translators $NAT_1$ 15a and $NAT_2$ 15b, so that each remote computer need not have a unique IP address. The gateway 15a or 15b may perform network address translation, act as a firewall, or perform both of these functions. Network address translation is a protocol that enables IP computers in a private realm to exchange data packets with IP computers in the public realm.

$NAT_1$ 15a may be a broadband router located at the user's premises 5. This is typical of a user with a cable Internet access or a digital subscriber line connection. $NAT_2$ 15b may be a function of a dial-up access device operated at the client's Internet Service Provider (ISP) 10. Through their respective NAT's 15a and 15b, remote computers $L_1$-$L_6$ connect to ASP 20 for service.

ASP 20 may have several servers. In this example, there are three servers 35a, 35b, and 35c. These servers each have a unique network address (for example, an IP address) and are configured in parallel, which means that each server has a similarly functioning software application. Each server has memory 37 to store program instructions for the software application and a processor 39 that executes the instructions.

Each of the servers 35a-c can provide service to a finite number of clients at any given time. As demand increases, additional servers may be added to the server farm 35a-c. Rather than assigning clients to specific servers 35a-c, all clients access the servers 35a-c through load balancer 25 and switch 30, which are placed at the "front-end" of ASP 20.

Load balancer 25 has memory 27 that stores program instructions for a load-balancing program and a processor 29 that executes the instructions. Load balancer 25 has a unique network address (for example, an IP address) that is used by all clients to access the services of ASP 20. Because clients access servers 35 through load balancer 25, ASP 20 can add additional servers 35 to the network, each with new unique network addresses, without the client having to be informed of the new unique network address.

When running latency-sensitive applications in packet-switched networks, it is preferable, and sometimes necessary, that once communication is established between the remote client computer and a particular server 35a, 35b or 35c, the communication is maintained through the same server until terminated by the client. The attribute of maintaining communication with the same server is known as "sticky." Also, the same server may need to be used because some protocols use more than one Port ID, which may be Transmission Control Protocol (TCP) ports, User Datagram Protocol (UDP) ports, or both. To prevent load balancer 25 from becoming a service bottleneck, an aspect of the invention provides that after one of servers 35a, 35b or 35c has been assigned, communications from the remote computers to the assigned server will bypass the load balancer 25 and proceed directly to the assigned server by addressing the message with the unique network address of the assigned server. This method allows ASP 20 to reduce the traffic through load balancer 25, increasing the quality of service for all of its clients.

To access the services of ASP 20, the remote computer $L_1$-$L_6$ may need to run a software application provided by the ASP 20 that is stored in the remote computer's memory 3. Alternatively, the software application that is executed by the remote computers may be provided by other means. For example, the software application may be a game application purchased in shrink-wrapped packaging at a consumer electronics store. In this case, the software application is programmed to communicate with the ASP servers 35. The user need only configure the software application with the unique network address (e.g., an IP address or domain name) of the ASP 20, which will typically be the address of the load balancer 25.

The software application running on the client's remote computer may allow the client to see on a display a list of the applications that are available through the ASP 20. Further information beyond a list of the applications may also be displayed. For example, the client may see on a display a list of a plurality of "incarnations" of the applications. For example, in the context of gaming, there may be multiple different "Quake" game "worlds" running and "Diablo" game "worlds" running. If ASP 20 provides more than one application, the client may select the application that the client wants to use from a menu. By selecting an application, or other similar predetermined user command, the software on the remote computer causes the remote computer to send a request for service, or a "probe request." The probe request is sent from the remote computer to the ASP 20 through NAT 15a or 15b.

Figure 2:
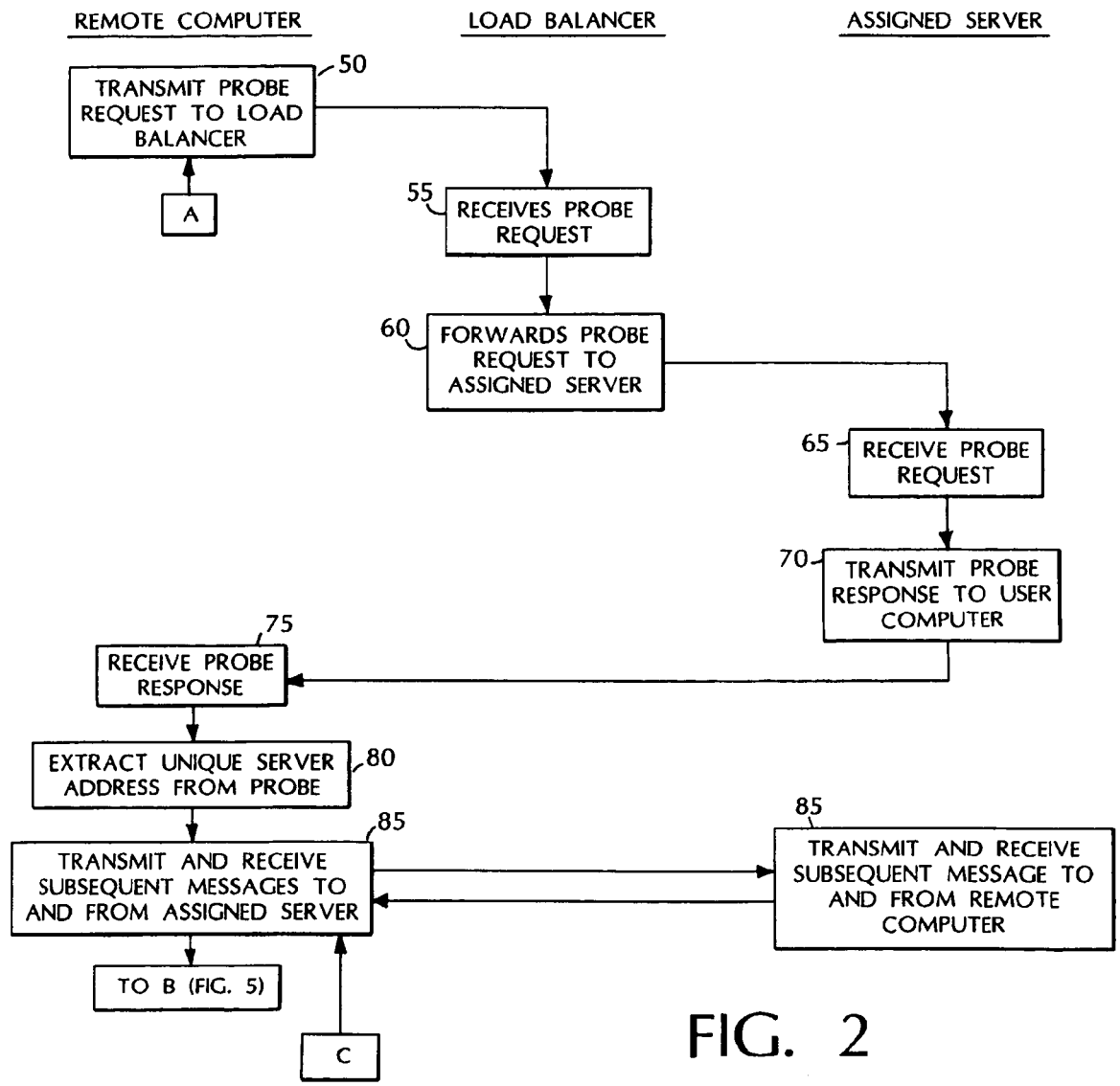
FIG. 2 is a flowchart showing the process of establishing communications between a remote computer and a server shown in FIG. 1.

FIG. 2 shows an embodiment of a method for establishing direct communications between a remote computer and an assigned server. First, the remote computer sends, at step 50, a probe request to the load balancer. The load balancer receives the probe request at step 55, and selects and assigns a server using a conventional selection algorithm. At step 60, the load balancer forwards the probe request to the assigned server. The assigned server receives the forwarded probe request at step 65. Next, the assigned server generates a "probe response" to be sent to the remote computer containing the unique IP address of the assigned server (e.g., 35b from FIG. 1) in the body of the response at step 70. The probe response is addressed to the NAT associated with the remote computer.

Alternatively, the probe response may be generated by the load balancer. In such a case, the load balancer may send two messages, the probe response to the remote computer and a message to the assigned server informing the server of the service request.

The remote computer receives the probe response at step 75, and extracts the unique network address of the assigned server (35b) from the response at step 80. The unique network address is extracted by the software provided by the ASP on the remote computer without the client's knowledge. Using this unique address, the remote computer thereafter communicates directly with assigned server 35b at step 85, bypassing the load balancer. This prevents load balancer 25 from becoming a service bottleneck and avoids the latency problems and inefficient use associated with unnecessarily routing traffic through the load balancer.

Figure 3:
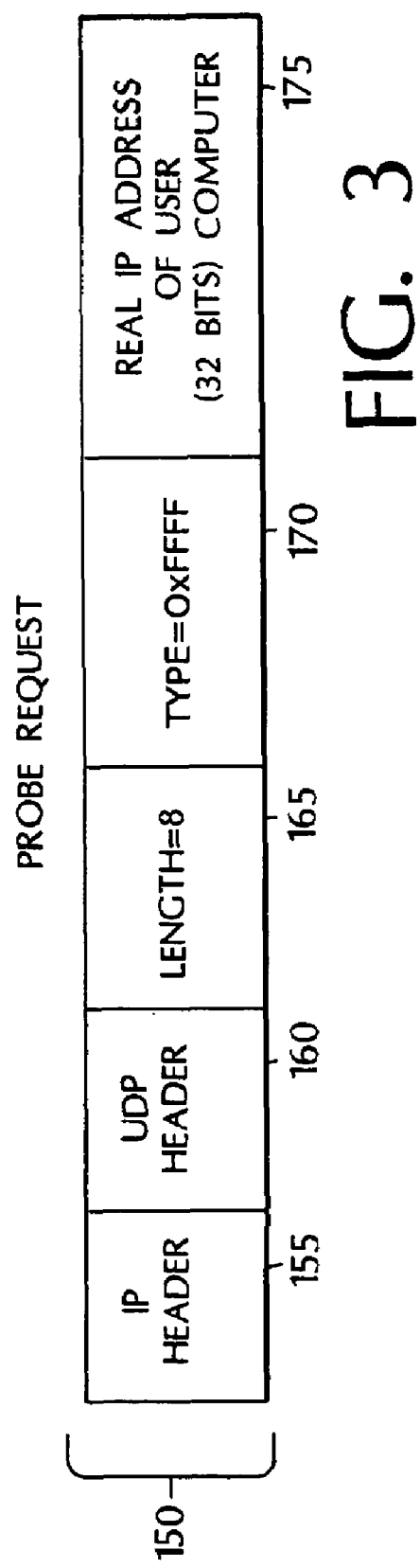
FIG. 3 is a diagram of a probe request data packet used in the process shown in FIG. 2.

FIG. 3 is a diagram of a probe request data packet 150 that may be sent by the remote computer to load balancer 25 to request service. Data packet 150 contains IP header 155 and UDP header 160. IP header 155 and UDP header 160 are address fields that are conventionally used in data packets that are transmitted over standard packet-switched networks. The IP header 155 contains the network address of the load balancer on the initial service request. On subsequent transmissions, the IP header 155 may contain the IP address of the assigned server.

After the load balancer or assigned server receives the data packet, the IP header and UDP header are removed and the remainder of data packet 150 is delivered to the port ID specified by UDP header 160. The port specifies a location within the server that responds to requests and communications of the particular software application provided by the ASP. In this embodiment, UDP messages are used. However, an equally valid implementation may use TCP messages or any other appropriate data format. The remaining fields of data packet 150 contain information that is unique to the software application that is being provided by the ASP 20. The information provided by the remaining packet fields 165, 170, and 175 may permit direct communications between the remote computer and the assigned server.

Length field 165 indicates the total length of fields 165, 170, and 175. For example, the length field 165 may be 2 bytes, field 170 may be 2 bytes, and field 175 may be 4 bytes. In that case, length field 165 would indicate a total length of 8 bytes, as shown in FIG. 3. Type field 170 indicates to the remote computer and server 35 what type of data packet is being transmitted. In this embodiment, the remote computer and server 35 recognize that a packet is a probe request or response by the data "0xFFFF" in type field 170. However, any unique data set may be used. Address field 175 contains the IP address of the NAT associated with the remote computer sending the probe request. This allows the assigned server to send a probe response to the remote computer. In this embodiment, address field 175 is 32 bits in length. If subsequent versions of IP protocols are implemented, address field 175 may increase in size to 128 bits or more.

Figure 4:
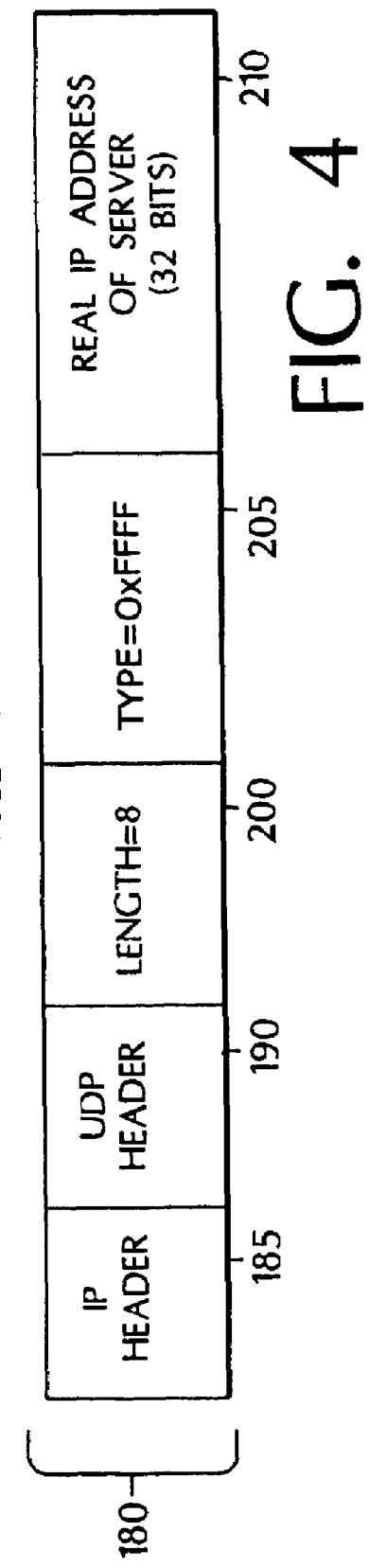
FIG. 4 is a diagram of a probe response data packet used in the process shown in FIG. 2.

FIG. 4 is a diagram of a probe response data packet 180 that may be sent by the assigned server (or alternatively, by the load balancer) to the remote computer after the receipt of the probe request from the remote computer. The format of data packet 180 is similar to that of data packet 150. Data packet 180 contains IP header 185 and UDP header 190. IP header 185 contains the network address of the NAT associated with the remote computer. UDP header 190 contains the address of the specific port in the remote computer that responds to requests and communications of the particular software application provided by the ASP 20.

Length field 200 indicates the total length of fields 200, 205, and 210. Type field 205 indicates to the remote computer and assigned server the type of data packet being transmitted. In this embodiment, the remote computer and the assigned server recognize that a packet is a probe request or response by the data "0xFFFF" in type field 170. However, any unique data set may be used. Address field 210 contains the unique IP address of the assigned server sending the probe response. The inclusion of the real IP address of the assigned server allows the remote computer to bypass load balancer and communicate directly with the assigned server.

There are a number of server-based applications that transmit latency-sensitive messages. Examples of applications include Internet telephony, multi-player gaming, music sharing, and other "peer-to-peer" type applications. In the example of Internet telephony, a client at computer $L_1$ may communicate with any other client at local computers $L_2$-$L_6$ or a non-local client at computers $N_1$-$N_6$. The clients may communicate using Voice over Internet Protocol ("VoIP"). Using VoIP, data packets containing communications are transmitted by means of the Internet Protocol. The resulting communication has two-way full-duplex incoming and outgoing calling capability.

To communicate using VoIP, the client would send a request to ASP 20 for service. The request for service, i.e., probe request, is directed to the load balancer at the ASP. Using the method described in FIG. 2, the remote computer may establish direct communication with an assigned server at the ASP bypassing the load balancer. By establishing communication with a server (in the VoIP context this server is often called a gatekeeper or proxy), the ASP is notified that the client is available to place and receive calls. The client remains in communication with the assigned server until the client terminates the service session.

Other clients of the ASP may also establish direct communications with a server at an ASP. The other clients of the ASP may connect to servers at ASP 20, 21, or 23 as shown in FIG. 1. If the client places a call to a client that has established communications with a server of ASP 20, the servers of ASP 20 will use a conventional method of negotiation to establish communications between the clients. If the other client has established communication with servers at ASP 21 or ASP 23, the servers of ASP 20 and the servers of ASP 21 or ASP 23 may communicate through Internet 40 using a conventional server-to-server protocol.

The communication between the servers of ASP 20, 21, and 23 allow clients to transmit and receive messages in real time using VoIP.

In the example of multi-player gaming, a client of ASP 20 may interact in a gaming setting with other clients of ASP 20, ASP 21, or ASP 23 in real time. To set up the game, the client sends a probe request to the load balancer of the ASP. A client may establish communication with a server using the method described in FIG. 2.

Once connected to the assigned server, the client may enter the gaming application's "lobby". The gaming lobby describes the game that is available or in progress on the server, and may also provide a listing of other clients that are participating in the game. The client may be the only client of the ASP using the gaming application, or the client could be one of many users. In the example of multiple users, the gaming application tracks the activity of a particular client in the game and transmits that information to all other clients that are playing the game.

Referring to FIG. 1, if the gaming application is running on a server at ASP 20, clients of ASP 21 may establish communication with a server of ASP 20 over Internet 40. Thus, a client in one locale may participate in a gaming application with a client in another locality in real time.

After direct communication has been established between a remote computer and an assigned server, the remote computer may monitor the communication using a fault tolerance technique in accordance with another aspect of the invention. This fault tolerance technique indicates whether the user computer and the assigned server are still in communication. Often, the client may realize that the communication has been terminated by the absence of activity or lack of a response by another client. In these situations, an indication from the fault tolerance technique may not be necessary. However, the fault tolerance technique may be helpful in applications where inactivity by another client is not immediately recognized.

Figure 5:
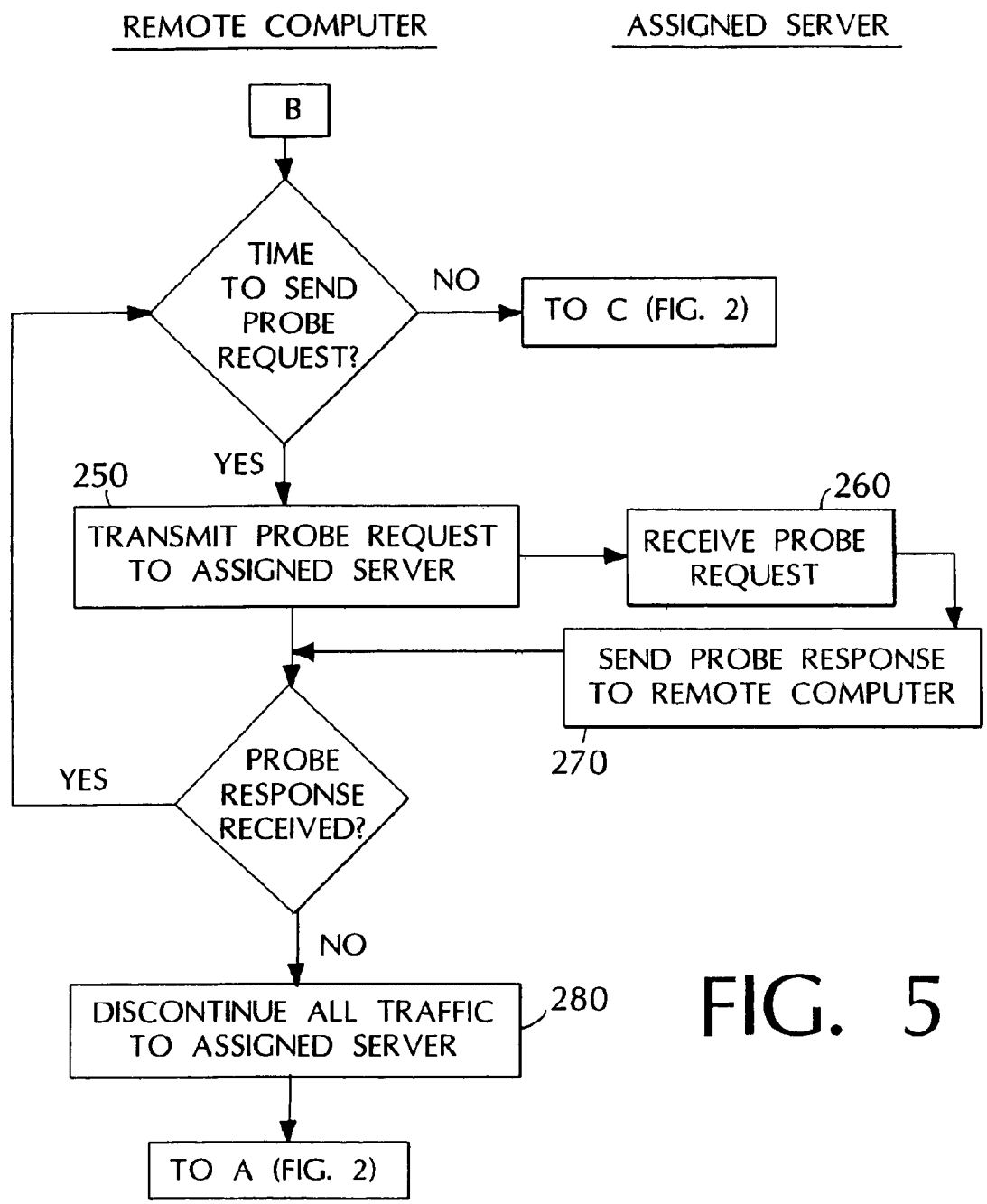
FIG. 5 is a flowchart showing the process of monitoring the communications between a remote computer and a server shown in FIG. 1.

FIG. 5 shows the process by which the fault tolerance technique monitors the communication between the remote computer and the assigned server. The connection may be monitored periodically (for example, once every 60 seconds or alternatively once after every tenth transmission) through the transmission of messages between the remote computer and the assigned server. The frequency at which the connection is monitored may vary depending on the application.

Periodically during the communications between the remote computer and the assigned server, the software application on the remote computer determines that the connection between the remote computer and the assigned server should be verified. The remote computer then sends, at step 250, a probe request to the assigned server. This probe request may be similar to the request transmitted to begin a service session discussed previously, and may be of the format shown in FIG. 3.

If the connection between the remote computer and the assigned server is operative, the assigned server receives the probe request at step 260. At step 270, the assigned server generates and sends a probe response to the remote computer. The probe response may be in the format of data packet 180 shown in FIG. 4.

If the remote computer receives a probe response from the assigned server, then the remote computer is aware that the connection is still operative. In that case, the remote computer continues to transmit messages to the assigned server until the fault tolerance technique requires that another probe request be sent. If the remote computer does not receive a probe response after a certain period of time, then the remote computer, and the client, knows there is a problem with the connection. In that case, the remote computer discontinues all traffic with the assigned server at step 280. The remote computer may then send a new probe request to the load balancer to establish a new communication at step 50 shown in FIG. 2.

This fault tolerance technique is an easy way to inform clients that they have lost connection. Informing clients that they have lost their connection at the earliest opportunity limits the frustration of clients who have lost the connection, and also minimizes the amount of data that may have been transmitted but lost after the connection failed.

A number of embodiments of the invention have been described. Nevertheless, it will be understood that various modifications may be made without departing from the spirit and scope of the invention. Accordingly, other embodiments are within the scope of the following claims.

What is claimed is:

1. A method of providing a remote networked computer with a service session using one of a plurality of similarly functioning software applications residing on different servers with different unique real network addresses, the method comprising:
   receiving, from the remote computer and at a device having a unique network address that is different from the network address of any of the servers, a packet-based message comprising a request for a service session;
   assigning one of the several servers to be used by the remote computer in the service session; and
   transmitting, to the remote computer, a packet-based message comprising the unique real network address of the assigned server for the remote user to address subsequent messages during the service session.

2. The method of claim 1 further comprising receiving, at the assigned server, subsequent packet-based messages from the remote computer as part of the service session, the subsequent messages each being addressed to the unique real network address of the assigned server.

3. The method of claim 2 further comprising, receiving, at the assigned server, periodic packet-based test messages from the remote computer, and in response, transmitting a packet-based message back to the remote computer to indicate an operable connection.

4. The method of claim 1, wherein the device that receives the message comprising a request for a service session is a load balancer.

5. The method of claim 1, wherein the software applications involve interaction between multiple remote computers.

6. The method of claim 5, wherein the software applications provide Internet telephony service.

7. The method of claim 5, wherein the software applications are multiple-user gaming applications.

8. The method of claim 5, wherein the software applications are music-sharing applications.

9. The method of claim 5, wherein the software applications are peer-to-peer applications.

10. The method of claim 4, wherein the message comprising a request for a service session includes a network address header containing the unique network address of the load balancer, a data port address header, and data fields associated with the software application.

11. The method of claim 10, wherein the data fields associated with the software application includes a length field, a type field, and a field containing the network address of the remote computer that requested the service session.

12. The method of claim 1, wherein the message transmitted to the remote computer comprising the unique real network address of the assigned server includes a network address header containing a unique network address associated with the remote computer that requested the service session, a data port address header, and data fields associated with the software application.

13. The method of claim 12, wherein the data fields associated with the software applications includes a length field, a type field, and a field containing the unique real network address of the assigned server.

14. The method of claim 1, wherein the unique real network addresses are all unique IP addresses.

15. The method of claim 1, wherein the packet-based message comprising the unique real network address of the assigned server is transmitted byte assigned server.

16. The method of claim 1, wherein the packet-based message comprising the unique real network address of the assigned server is transmitted by a load balancer.

17. An apparatus for providing service sessions to remote networked computers, comprising:
   a plurality of servers each having a different unique real network address, each of the servers for executing a similarly functioning software application to provide a service session;
   a load balancer having a unique network address different from the unique real network address of any of the servers, the load balancer comprising a first processor and first memory for storing thereon instructions that when executed by the first processor assigns, in response to receiving from a remote networked computer a packet-based message comprising a request for a service session, one of the savers to be used by the remote computer in the service session;
   a second processor and second memory for storing thereon instructions that when executed by the second processor transmits, to the remote networked computer that requested service, a packet-based message containing the identity of the unique real network address of the assigned saver to which the remote networked computer is to address packet-based messages during the service session.

18. The apparatus of claim 17, wherein the first and second processors are the same, and the first and second memory are the same, the second processor and second memory thus being part of the load balancer.

19. The apparatus of claim 17, wherein the second processor and the second memory are part of the assigned server.

20. The apparatus of claim 17, wherein the software applications involve interaction between multiple remote users.

21. The apparatus of claim 20, wherein the software applications are Internet telephony applications.

22. The apparatus of claim 20, wherein the software applications are multiple user gaming applications.

23. The method of claim 20, wherein the software applications are music-sharing applications.

24. The method of claim 20, wherein the software applications are peer-to-peer applications.

25. The apparatus of claim 17, wherein the message comprising a request for a service session includes a network address header containing the unique network address of the load balancer, a data port address header, and data fields associated with the software application.

26. The apparatus of claim 25, wherein the data fields associated with the software application includes a length field, a type field, and a field containing the network address of the remote computer that requested the service session.

27. The apparatus of claim 17, wherein the message transmitted to the remote computer comprising the unique real network address of the assigned server includes a network address header containing a unique network address associated with the remote computer that requested the service session, a data port address header, and data fields associated with the software application.

28. The apparatus of claim 27, wherein the data fields associated with the software applications includes a length field, a type field, and a field containing the unique real network address of the assigned server.

29. The apparatus of claim 17, wherein the unique real network addresses are all unique IP addresses.

30. An apparatus that assigns, for a service session, one of a plurality of servers with unique real network addresses, each of the plurality of servers being capable of executing a similarly functioning software application to provide the service session, the apparatus comprising:
   a unique network address that is different from the unique real network address of any of the plurality of servers;
   a processor; and
   memory for storing thereon instructions that when executed by the processor perform the following functions:
   assigns one of the servers to be used by a remote computer in the service session in response to receiving a packet-based message comprising a request for the service session from the remote computer; and
   transmits, to the remote computer that requested the service session, a packet-based message containing the unique real network address of the assigned server to which the remote computer is to address packet-based messages during the service session.

31. The apparatus of claim 30, wherein the message comprising a request for a service session includes a network address header that contains the unique network address of the apparatus, a data port address header, and data fields associated with the software application.

32. The apparatus of claim 31, wherein the data fields associated with the software application includes a length field, a type field, and a field containing the network address of the remote computer that requested the service session.

33. The apparatus of claim 30, wherein the message transmitted to the remote computer comprising the unique real network address of the assigned server includes a network address header containing a unique network address associated with the remote computer that requested to service session, a data port address header, and data fields associated with the software application.

34. The apparatus of claim 33, wherein the data fields associated with the software applications includes a length field, a type field, and a field containing the unique real network address of the assigned server.

35. Computer readable medium having stored thereon program instructions that, when executed by a processor in a networked computer, perform the following functions:
   transmits, in response to a predetermined user command input to the networked computer, a packet-based message comprising a request for a service session to a remote service provider, the message being addressed to a unique network address associated with the service provider, the service provider comprising a plurality of different servers with different unique real network addresses, each of the servers having thereon similarly functioning software applications to provide a service session;
   in response to receiving from the service provider a packet-based message comprising a unique real network address for one of the plurality of servers that has been assigned for the service session, transmits during the service session packet-based messages addressed to the unique real network address of the assigned server.

36. The computer readable medium of claim 35, wherein the service session involves interaction between multiple networked computers remote from the service provider.

37. The computer readable medium of claim 36, wherein the service session is an Internet telephony application.

38. The computer readable medium of claim 36, wherein the service session is a multiple-user gaming application.

39. The computer readable medium of claim 35, further comprising instructions that when executed by the processor perform the following functions:
   periodically transmits during the service session packet-based test messages addressed to the unique real network address of the assigned server;
   determines that a connection with the assigned server is disconnected if a packet-based message responding to the test message is not received from the assigned server within a predetermined period of time.

40. The computer readable medium of claim 39, further comprising instructions that when executed by the processor perform the following function:
   in response to determining that a connection with the assigned server is disconnected, transmits a packet-based message comprising a request for a service session to the remote service provider and addressed to the unique network address associated with the service provider.

* * * * *